March 28, 1944.   E. D. LILJA   2,344,991
CONDITION CONTROL
Filed Oct. 11, 1939   3 Sheets-Sheet 1

INVENTOR
Edgar D. Lilja.
BY
Parker, Carlson, Pitzner & Hubbard
ATTORNEYS

March 28, 1944.  E. D. LILJA  2,344,991
CONDITION CONTROL
Filed Oct. 11, 1939  3 Sheets-Sheet 3

INVENTOR
Edgar D. Lilja
BY
Parker, Carlson, Pitzner & Hubbard
ATTORNEYS

Patented Mar. 28, 1944

2,344,991

UNITED STATES PATENT OFFICE 2,344,991

CONDITION CONTROL

Edgar D. Lilja, Rockford, Ill., assignor to Barber-Colman Company, Rockford, Ill., a corporation of Illinois Application October 11, 1939, Serial No. 298,955

6 Claims. (Cl. 236—46)

This invention relates generally to the control of conditioning apparatus to maintain a condition to be controlled at a substantially uniform value. In certain of its aspects, the invention relates to controls of the so-called proportioning type wherein the effective capacity of the conditioning apparatus is adjusted automatically in proportion to changes in the magnitude of the condition being controlled.

One object is to obtain such proportioning action by controlling the movements of a regulating member through fixed increments, for example, to on and off positions instead of with a reversing or modulating action.

Another object is to provide a novel method of and apparatus for producing alternate condition-increasing and condition-decreasing movements of a condition regulator.

A more detailed object is to provide for cyclic operation of a condition regulator by alternately and periodically raising and lowering the effective control point of a condition-responsive instrument by which the regulator is controlled.

The invention also resides in the novel manner of adjusting the control point.

Figure 1:
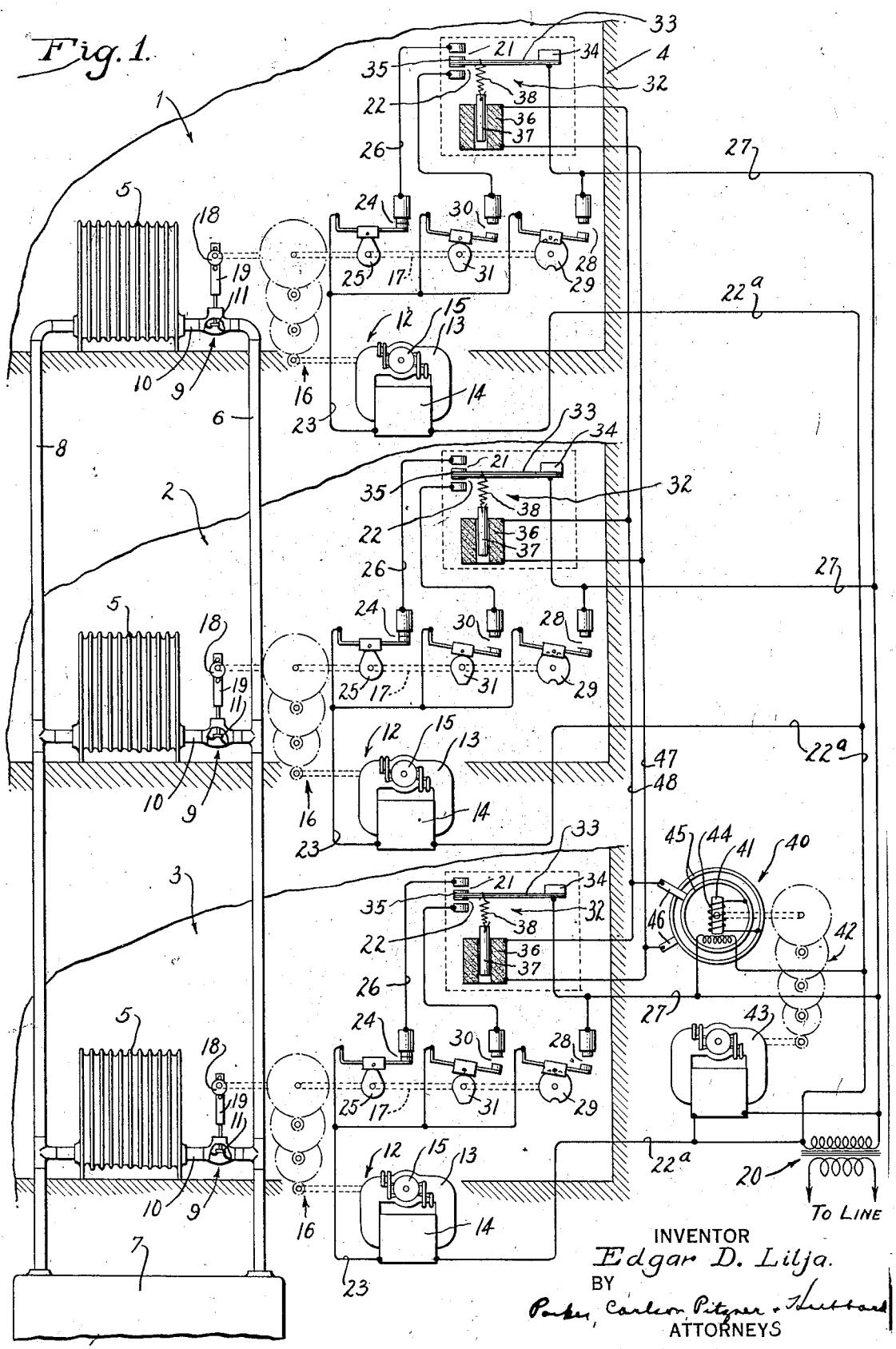
Figure 2:
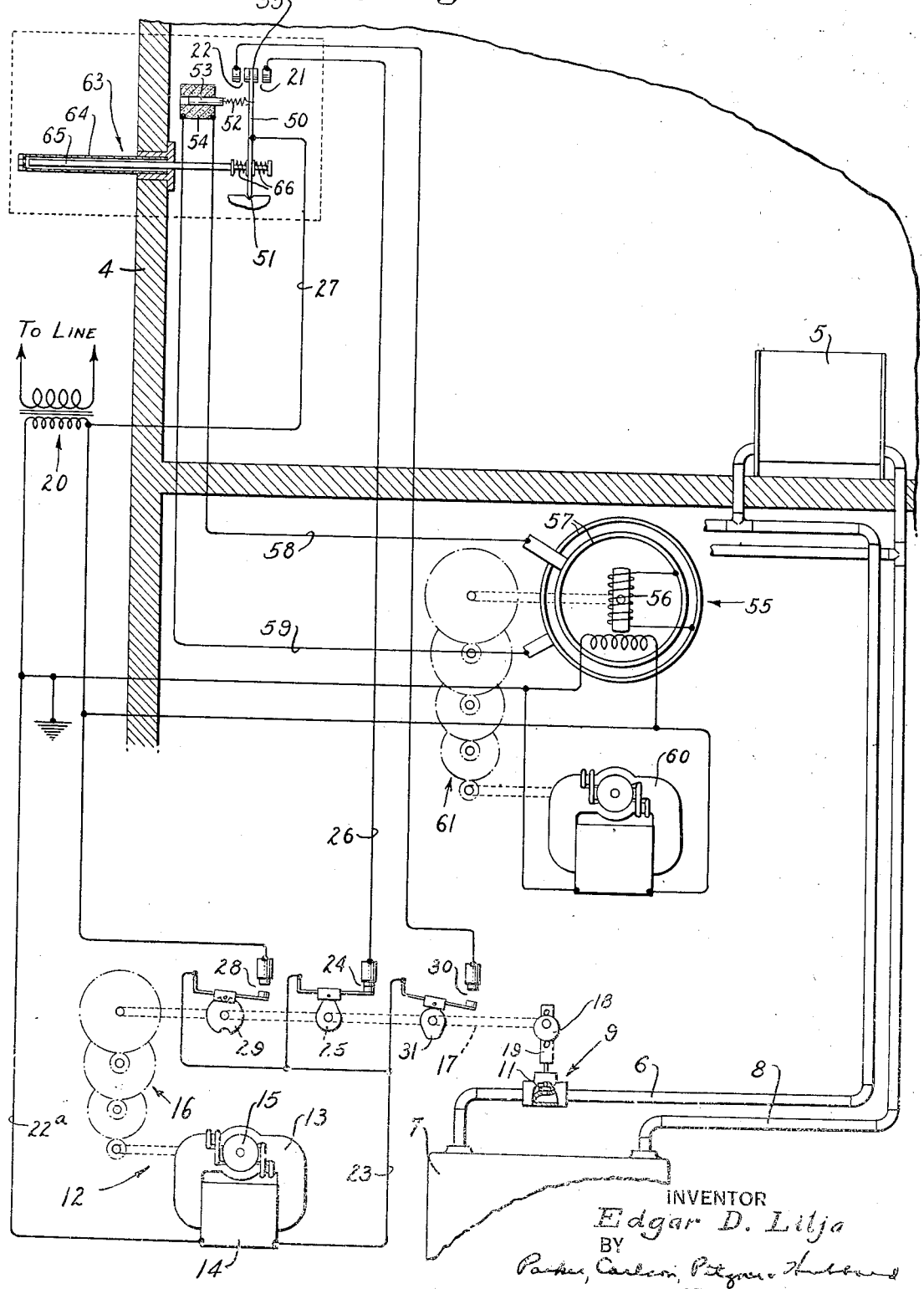
Figure 3:
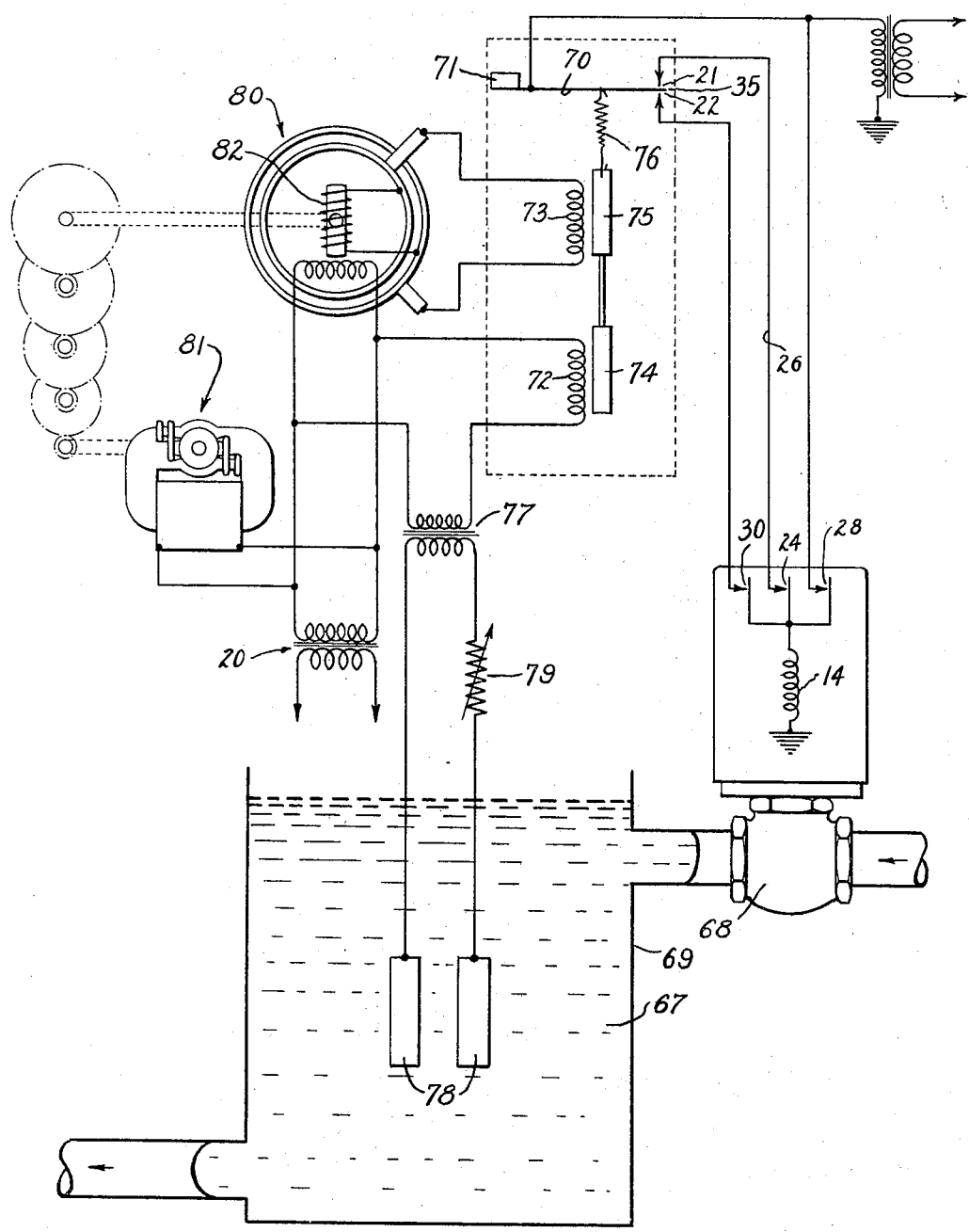

Other objects and advantages of the invention will become apparent from the following detailed description taken in connection with the accompanying drawings, in which Figures 1, 2, and 3 are schematic views and wiring diagrams illustrating different applications of the control constituting the present invention.

The invention is susceptible of a wide variety of uses and is adaptable to the control of any physical or chemical condition such, for example, as temperature, pressure, and electrical quantities that gives rise to variations in a measurable force which may be utilized in producing selective controlling action. Several possible uses of the invention have been shown in the drawings and will be described in detail herein, merely for purposes of illustration. It is to be understood, however, that I do not intend to limit the invention in any way by such exemplary disclosure but aim to cover all modifications, alternative constructions, methods, and uses falling within the spirit and scope of the invention as expressed in the appended claims.

Condition control apparatus of the so-called positive or "on" and "off" type is especially adapted for automatic control in accordance with the present invention. Such apparatus usually involves a valve, damper, rheostat, speed changer, or other regulator movable through fixed increments between spaced positions to render the conditioner substantially ineffectual or effectual at a predetermined capacity. Automatic control of such conditioners is usually effected by a condition-responsive instrument operable to cause movement of the regulator to condition-decreasing and condition-increasing positions when the condition to which the instrument responds respectively rises above and falls below a predetermined value determined by the setting of the instrument and hereinafter referred to as the instrument control point.

The general method contemplated by the present invention involves alternately and progressively raising and lowering the control point of the condition-responsive instrument through a predetermined condition range in successive prolonged intervals whereby to cause movements of the regulator intermittently and alternately to condition-increasing and condition-decreasing positions independently of the prevailing condition value within such range. The prevailing condition value will influence the times in the cycles at which the instrument responds to such independent control point changes with the result that the relative lengths of the intervals during which the regulator is in condition-increasing and condition-decreasing positions will vary automatically in accordance with the prevailing condition value so as to change the average conditioning capacity of the apparatus to correspond to the magnitude of said condition value. Thus, a true proportioning control action is obtained, and this in spite of the fact that the regulator is not modulated but instead moved uninterruptedly between on and off positions.

Figure 1 illustrates an adaptation of the improved control to a system for governing the temperature in different zones 1, 2, and 3 of a building 4. For heating, a conditioner such as a radiator 5 in each zone may be supplied with conditioning medium such as steam from a main 6 leading from a source 7 to which the condensate is returned through a line 8. To regulate the flow of steam to the radiators, valves 9 are interposed in the branch supply pipes 10 and have members 11 movable from "off" position against the valve seat to a predetermined "on" or open position.

Herein, the regulating valve 9 for each zone is actuated by a power operator 12 comprising an electric motor 13 having a main winding 14 and a rotor 15 connected by speed reduction gearing 16 to a shaft 17 carrying a cam 18 which, in successive half revolutions of the shaft, operates a follower 19 to alternately open and close the valve. The valve opening and closing cycles of the operator are initiated by closure of condition-responsive switches 21 and 22 respectively. Closure of the switch 21 completes a starting circuit for the motor 13 extending from a source 20 of alternating current through a conductor 22$^a$, the winding 14, a conductor 23, a switch 24 which is closed by a cam 25 when the valve is closed, a conductor 26, the switch 21, and a power conductor 27. When the motor is thus started, its operation is maintained by closure of a parallel circuit through a switch 28 which is allowed to open by a cam 29 after a half revolution of the shaft 17, the switch 24 having been opened in the meantime. Similarly, when the switch 22 is closed with the valve open, a starting circuit is established through a switch 30 which is closed by a cam 31 when the valve is in open position.

The switches 21 and 22 form part of the condition-responsive instrument which, for controlling a heating system, ordinarily would take the form of a simple thermostat 32 located at a representative point in the building zone. The condition-responsive element of the thermostat shown comprises a bi-metallic strip 33 adjustably supported at 34 to provide for the usual selective manual adjustment of the instrument control point. Such a mounting is shown, for example, in Patent No. 2,279,305. A contact 35 carried by the free end of the strip 33 moves in a direction to close the switch 21 when the ambient temperature falls below the prevailing control point of the instrument, that is, the temperature at which both switches will be held open. In response to a temperature rise above such control point, the switch 22 will be closed causing closure of the associated radiator valve 9. By adjusting the mounting of the strip, the control point may be changed and the instrument conditioned for the maintenance of any zone temperature that may be desired.

In accordance with the present invention, each zone instrument is equipped with auxiliary means by which its control point may be shifted automatically and progressively. Herein, this auxiliary adjustment is effected electrically from a remote point of control by varying the energization of an electrical device such as a solenoid 36 associated with each thermostat. A plunger type armature 37 projects into the solenoid coil and is connected through a light contractile spring 38 with the strip 33 adjacent the movable end of the latter.

It will be observed that the pull of the solenoid will oppose the stress which is set up in the strip 33 by falling temperatures and the contact 35 will be held in the neutral position shown at a given ambient temperature determined by the manual adjustment of the thermostat and also the prevailing energization of the solenoid. Then, as the ambient temperature rises, the reduced stress in the strip 33 will permit the solenoid to close the switch 22. Similarly, the increased stress incident to a fall in temperature will overcome the pull of the solenoid and close the switch 21.

As previously set forth, the invention contemplates alternately raising and lowering the control point of each thermostat progressively and independently of the prevailing temperature and through a range which normally includes the temperature desired to be maintained as determined by the manual setting of the instrument. This is accomplished by alternately increasing and decreasing the energization of the solenoids 36 through the medium of a continuously operated voltage regulator 40. As shown, the latter is of the single phase induction type comprising a rotor 41 driven through speed reduction gearing 42 from an electric motor 43 excited from the current source 20. Preferably, the gearing is such that the rotor will turn approximately one revolution per hour so as to increase and decrease the thermostat control points slowly in cycles which are many times as long as the relatively short intervals required for opening or closing of the valve. The alternating current voltage induced in the rotor coil 44 varies from zero to a maximum and back to zero twice during each revolution of the rotor, and this voltage is applied through slip rings 45, brushes 46, and conductors 47 and 48 to opposite terminals of the solenoids 36.

As the voltage increases from zero to maximum, as it will every half hour with the arrangement above described, the control point of each thermostat will be lowered gradually a fixed amount, for example, three degrees, and then gradually raised again to the value determined by the manual setting of the thermostat as zero voltage is restored. Now, if the temperature of any zone is slightly above the selected setting of its thermostat, the strip 33 will be warped downwardly thermally causing the switch 22 to remain closed throughout the voltage regulator cycle. Thus, the valve 9 will remain closed continuously.

The opposite extreme condition exists when the zone temperature falls to a value more than three degrees (the drop above assumed) below the value desired to be maintained. As a consequence, the strip 33 will be warped upwardly an amount sufficient to keep the switch 21 closed continuously, the valve remaining open, even when the solenoid is fully excited and therefore exerting its maximum pull on the strip. This condition of the valve obtains until enough heat has been delivered to raise the zone temperature to within three degrees of the desired value.

Assuming that the temperature in the zone controlled by one thermostat is one and one-half degrees below normal, the strip 33 will be warped upward an amount sufficient to maintain the switch 21 closed, and the corresponding radiator valve open, for one-quarter of each voltage regulator cycle. During the next quarter of the cycle, the pull of the solenoid is sufficient to reverse the direction of strip flexure and maintain the switch 22 closed, the radiator valve being closed during this time. The valve is therefore wide open for fifteen minutes and then completely closed for fifteen minutes alternately as long as the temperature remains one and one-half degrees below normal. An increase in zone temperature will reduce the percentage of time that the valve is open and a drop in temperature will raise the percentage.

It will be seen from the foregoing that in any zone requiring partial heating, the radiator valve will be fully open during part of each period when the solenoid voltage is falling to, and rising from, zero, the valve being completely closed during the remaining portions of the voltage regulator cycle, when the voltage is rising to, and falling from, its maximum value. The proportion of the cycle during which the valve remains open is proportional to the amount of the temperature deviation below normal because the points in the voltage regulator cycle at which the valve-opening and valve-closing switches 21 and 22 become closed are determined by the ambient temperature as reflected by the stress in the thermostatic element. Thus, in spite of the fact that the voltage regulator causes a periodic shift in the control point of each thermostat through a fixed range, the heating capacity of the radiator, that is, the average rate of heat supply, will always be proportional to the demand up to the limit of the radiator. As a result, a true proportioning action is obtained, the average rate of heat delivery changing automatically in proportion to zone temperature changes.

While the periodic shift in the control points of the different thermostats follows an invariable pattern determined by the characteristics of the voltage regulator, independent proportioning action will be obtained in different zones. Thus, the setting of each thermostat may be changed for the maintenance of the temperature desired without affecting the action of the voltage regulator in producing a true proportioning action.

Figure 2 illustrates how the invention may be utilized to simplify the control equipment required and produce more accurate regulation in a temperature control system of the type wherein the temperature changer is turned on and off alternately in timed cycles which are varied in relative lengths in accordance with changes in the rate of heat transfer through the building walls. For convenience of illustration, the same type of conditioner and regulator is employed as in the system shown in Fig. 1 and the parts are numbered correspondingly.

To close the control switches 21 and 22 alternately and produce heat on and off cycles of the heater, the common switch contact 35 is carried on the free end of an arm 50 pivoted at 51 and yieldably biased to a predetermined position. Intermediate its end the arm is connected by a contractile spring 52 with the plunger armature 53 of a solenoid 54. Energization of the latter is increased and decreased alternately by a voltage regulator 55 similar to the regulator previously described and having its rotor secondary 56 connected through slip rings 57 and conductors 58 and 59 to opposite terminals of the solenoid. The rotor is normally driven continuously by an electric motor 60 operating through reduction gearing 61 to produce the desired rotor speed. For most systems, this will range from one to two revolutions per hour, the current energizing the solenoid 54 rising to a maximum and returning to zero twice per revolution.

Provision is preferably made for varying the relative lengths of the heat on and off periods progressively and automatically in accordance with changes in the rate of heat loss from the building which is substantially directly proportional to the depression of the outside temperature below the building temperature. In the present instance, such variation of the cycle lengths is effected by a thermostatic actuator 63 exerting a variable force on the switch arm 50 varying with changes in the outside temperature. The thermostatic actuator herein shown includes a tube 64 of material such as aluminum having high expansibility and exposed exteriorly of the building. Within the tube is a rod 65 of Invar or the like having one end fixed to the outer end of the tube and the inner end coupled to the arm 50 by two compression springs 66 acting between opposite sides of the arm and shoulders on the rod 65.

The tube 64 and the rod 65 coact with the switches 21 and 22 to form a thermostat which will respond to a few degrees change in the outside temperature and which has a control point that is shifted progressively with changes in the energization of the solenoid 54. The range of such shift would ordinarily be approximately 90 deg. F., for example, from 70 deg. down to —20 deg.

As a result of the arrangement described above, the thermostatic actuator will influence the times in the current changing cycles that the control switches will become closed individually. Thus, as the outside temperature falls, the free end of the rod 65 moves to the right and through the springs 66, biases the arm 50 so as to close the switch 21 earlier and hold it closed for a longer time in each cycle. This results in a lengthening of the valve open periods and a corresponding shortening of the valve closed periods. Similarly, a rise in the outside temperature produces a resultant shift of the free end of the rod 65 to the left causing the valve to remain closed for a longer proportion of each cycle with a consequent shortening of the heat-on periods and a corresponding lengthening of the off periods. If the outside temperature falls below —20 deg. F., the switch 21 will remain closed even with the solenoid current at a maximum resulting in a continuous supply of heat. Likewise, when the outside temperature rises above the range of the thermostat, that is, above 70 deg. F., the raising of the thermostat control point incident to decreasing the solenoid current to zero will not be effectual in closing the switch 21. As a result, the radiator valve will remain closed.

It will be apparent from the foregoing that by the combined action of the thermostat and the electric control point shifter, the supply of heat to the room or zone will be turned on and off alternately when normal outside temperatures prevail during the heating season. The relative lengths of the on and off periods will be varied as the outside temperature changes establishing average rates of heat delivery which are directly proportional to the depression in the outside temperature below the room temperature. These variations are progressive over the operating range of the outside thermostat instead of step by step as in most prior cycling control systems. In addition, the cycling mechanism for timing the periods and varying the same is much simpler in construction than the step by step controllers heretofore used.

If desired, various devices such as a limit room thermostat or a thermostat responsive to the temperature of the steam riser may be added to supplement the control by the cycling mechanism under certain operating conditions. Such auxiliary controls form the subject matter of a copending application of Theodore K. Greenlee, Serial No. 196,104, and have been omitted from the present disclosure for the sake of simplicity of explanation.

Figure 3 illustrates schematically still another adaptation of the invention wherein the conductivity of a liquid 67 is the condition to be controlled. A substantially uniform value of the condition is regulated by a mixing valve 68 which, as before, operates between on and off positions to control the flow of a fluid to respectively increase and decrease the conductivity of the mixture in a tank 69. Under the control of the circuits shown and previously described, the valve is moved to open and closed positions respectively in response to closure of switches 21 and 22 respectively, the common contact of which is carried by a resilient arm 70 supported at 71.

In the present instance, the position of the arm 70 is determined by the cumulative pull of two solenoids 72 and 73 having their armatures 74 and 75 connected together and joined to the arm 70 through the medium of a contractile spring 76. The solenoid 72 is variably energized in accordance with changes in the conductivity of the liquid 67. To this end, it is connected to the alternating current source 28 through a circuit which includes the primary of a transformer 77. The transformer secondary is connected with two electrodes 78 in the liquid 67. The conductivity of the mixture determines the secondary load on the transformer 77 and therefore the impedance in the solenoid circuit. An adjustable rheostat 79 in the secondary circuit permits adjustment of the control point of the conductivity measuring instrument thus formed, that is to say, the conductivity value at which neither of the switches will be closed.

Periodic raising and lowering of the control point of the conductivity instrument is effected by an induction voltage regulator 80 whose rotor is driven by a motor 81 at a speed correlated with the characteristics of the regulating system. The rotor winding 82 is connected through slip rings to opposite terminals of the solenoid 73 the energization of which is therefore increased and descreased alternately to thereby cause opening and closing of the valve for periods the relative lengths of which are a function of the resistivity of the liquid 67. Accordingly, the average rate of flow of condition changing fluid is approximately proportional to the magnitude of the resistivity of the mixture.

I claim as my invention:

1. The combination of a condition-responsive instrument, an electrical device associated with said instrument and operating immediately in response to a change in its electrical energization to adjust the control point of the instrument variably in accordance with the degree of energization of the device, a condition regulating member movable uninterruptedly in cycles of fixed lengths to condition-increasing and condition-decreasing positions in response to condition deviations below and above the prevailing control point of said instrument, and mechanism operable to alternately and progressively increase and decrease the energization of said device during cycles each of which is many times longer than the cycles of said member whereby the time during which said member is disposed in condition-increasing position will be proportional to the deviation of said condition from a predetermined value.

2. The combination of a condition-responsive instrument, an electrical device associated with said instrument and operating immediately in response to a change in its electrical energization to adjust the control point of the instrument variably in accordance with the degree of energization of the device, a condition regulating member movable to condition-increasing and condition-decreasing positions in response to condition deviations below and above the prevailing control point of said instrument, a voltage regulator governing the energization of said device, and motor driven means actuating said regulator to alternately and progressively increase and decrease the energization of said device gradually.

3. The combination of a condition-responsive instrument, an electromagnet associated with said instrument and operating immediately in response to a change in electrical energization to adjust the control point of the instrument variably in accordance with the degree of such energization, a condition regulating member movable to condition-increasing and condition-decreasing positions in response to condition deviations below and above the prevailing control point of said instrument, and independently acting timing mechanism operable to alternately and progressively effect gradual increase and decrease in the energization of said electromagnet.

4. For use with condition changing apparatus an instrument responsive to condition changes produced by said apparatus and having a selectively adjustable control point, an electrical device associated with said instrument and operating to adjust said control point variably in accordance with the degree of electrical energization of the device, a member regulating the conditioning capacity of said apparatus and movable between condition-increasing and condition-decreasing positions under the control of said instrument and in response to condition deviations in opposite directions from the prevailing control point of the instrument, and mechanism operable to effect gradual increases and decreases in the electric current energizing said device progressively and alternately at a frequency such that the time during which said member is in one of said positions is proportional to the prevailing value of the condition to which said instrument responds.

5. The combination of an instrument responsive to condition changes and having a selectively adjustable control point, an electrical device associated with said instrument and operating to adjust said control point variably in accordance with the degree of electrical energization of the device, a condition regulating member movable between condition-increasing and condition-decreasing positions under the control of said instrument and in response to condition deviations in opposite directions from the prevailing control point of the instrument, and mechanism operable to alternately increase and decrease the electrical energization of said device gradually during successive intervals each less than one hour in duration.

6. The combination with condition changing apparatus of an instrument responsive to condition changes produced by said apparatus and having a selectively adjustable control point, an electrical device associated with said instrument and operating to adjust said control point variably in accordance with the degree of electrical energization of the device, a member regulating the conditioning capacity of said apparatus and movable between condition-increasing and condition-decreasing positions under the control of said instrument and in response to condition deviations in opposite directions from the prevailing control point of the instrument, and timing mechanism operable to effect gradual increases and decreases in the electric current energizing said device progressively and alternately at regularly recurring intervals sufficiently frequent to prevent the establishment of an equilibrium value of said condition while said member is in either of said conditioning changing positions.

EDGAR D. LILJA.